(12) United States Patent
Tabe

(10) Patent No.: US 6,801,841 B2
(45) Date of Patent: Oct. 5, 2004

(54) STANDARD TRANSPORTATION EXCELLENT MAINTENANCE SOLUTIONS

(76) Inventor: Joseph A. Tabe, 525 Thayer Ave., Suite 315, Silver Spring, MD (US) 20910

(*) Notice: Subject to any disclaimer, the term of this patent is extended or adjusted under 35 U.S.C. 154(b) by 0 days.

(21) Appl. No.: 10/096,575

(22) Filed: Mar. 14, 2002

(65) Prior Publication Data

US 2002/0147610 A1 Oct. 10, 2002

Related U.S. Application Data

(60) Provisional application No. 60/268,572, filed on Feb. 15, 2001.

(51) Int. Cl.[7] .................. G06F 9/44; G06F 19/00; H04B 7/00
(52) U.S. Cl. .................. 701/29; 701/32; 709/217
(58) Field of Search .................. 701/29, 32, 35, 701/36; 700/108, 109, 110; 709/100, 217, 203, 227, 310; 370/395.61, 389, 395.1, 395.5, 395.6; 717/171, 173

(56) References Cited

U.S. PATENT DOCUMENTS

| | | | | |
|---|---|---|---|---|
| 4,404,639 A | * | 9/1983 | McGuire et al. | 364/551 |
| 6,122,527 A | * | 9/2000 | Robinson et al. | 455/557 |
| 6,308,120 B1 | * | 10/2001 | Good | 701/29 |
| 6,353,734 B1 | * | 3/2002 | Wright et al. | 455/98 |
| 6,424,991 B1 | * | 7/2002 | Gish | 709/203 |
| 6,434,455 B1 | * | 8/2002 | Snow et al. | 701/33 |
| 6,438,468 B1 | * | 8/2002 | Muxlow et al. | 701/3 |
| 6,487,717 B1 | * | 11/2002 | Brunemann et al. | 717/173 |
| 6,512,773 B1 | * | 1/2003 | Scott | 370/395.61 |
| 6,539,271 B2 | * | 3/2003 | Lech et al. | 700/108 |
| 6,543,007 B1 | * | 4/2003 | Bililey et al. | 714/26 |
| 6,597,973 B1 | * | 7/2003 | Barich et al. | 701/29 |

* cited by examiner

Primary Examiner—Tan Q. Nguyen
Assistant Examiner—Dalena Tran
(74) Attorney, Agent, or Firm—Krieg DeVault Lundy LLP

(57) ABSTRACT

A transportation information system's technology for communicating with end users to finding transportation solutions on failed components, a detailed description of a failed component's behavior is typed-in and analyzed by the system's software and a solution is enabled from its database warehouse. After the solution is enable, the system generates a repair order form for record keeping of the failed component repaired and also generates preventive maintenance inspection programs and forms from counting a preset mileage of logged-on equipment.

20 Claims, 6 Drawing Sheets

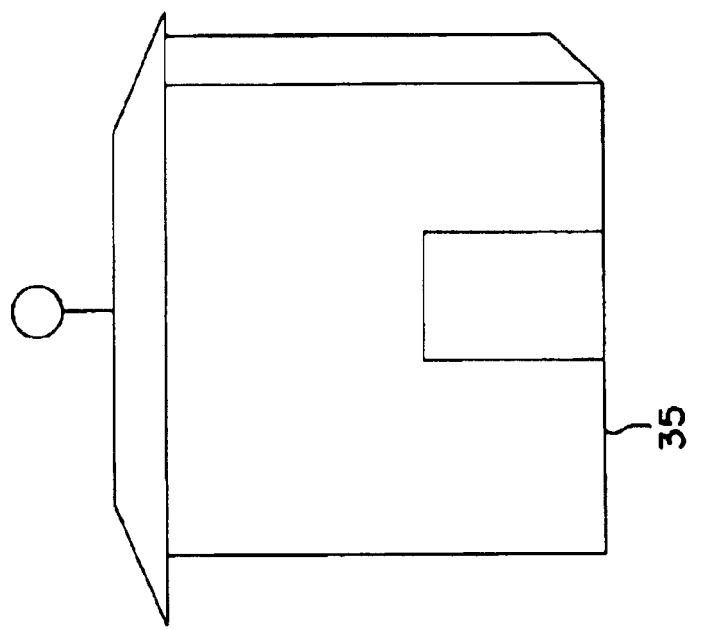
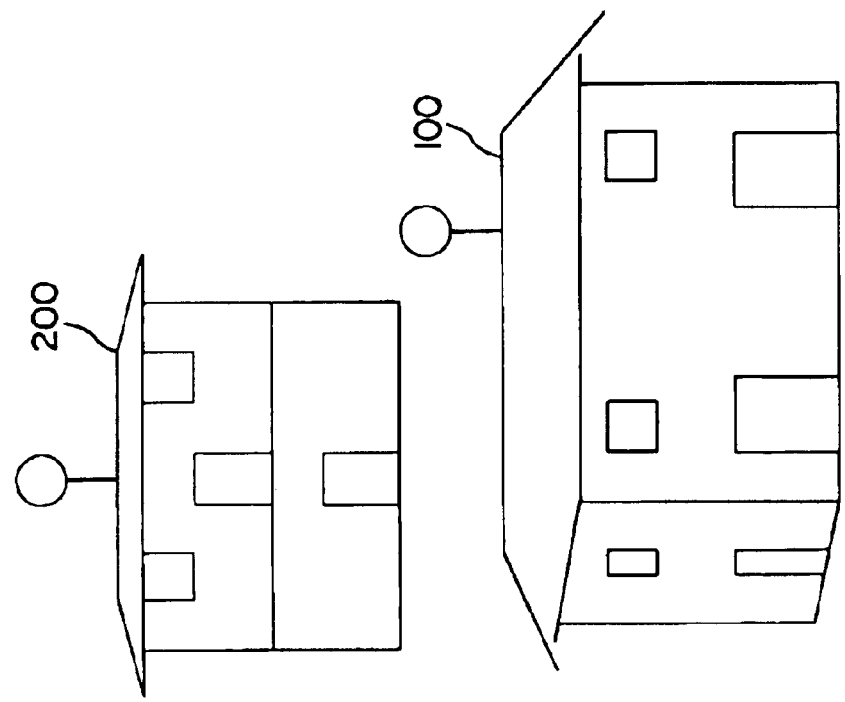
FIG. 1

STANDARD TRANSPORTATION EXCELLENT MAINTENANCE SOLUTIONS

This application claims the benefit of Provisional application Ser. No. 60/268,572, filed Feb. 15, 2001.

TECHNICAL FIELD

Standard Transportation Excellent Maintenance Solutions "STEMS," is an online supplier of absolute information system's technology designed for the transportation industries preventive maintenance and repairs. STEMS establishes electronic commerce programs designed to prevent accidents from occurring and also to reduce the risk of injuries resulting from misrepresentation of transportation or commerce motors. STEMS provide technical support to industries and corporations for the use of commercial motors, transport planes, and other transportation equipment by drivers of any transportation vehicle carrier. Its technical support provides thorough periodic preventive maintenance, pre-trip and post-trip, including mechanical failure analysis, before the vehicle is allowed on the public roads or airways.

BACKGROUND OF THE INVENTION

The prevention of accidents in the transportation industry applies to every vehicle, person and employer of such persons as defined by law, who operates a commercial motor vehicle in commerce in any state. STEMS supplies transportation failure analysis and solutions, including standard transportation preventive maintenance inspection programs, scheduling, and forms, designed to assist industries and corporations with excellent analytical rundown of industrial problem quo solutions to preventive maintenance inspections "PMI" procedures. The scheduling of transportation equipment for maintenance inspection is made flexible through STEMS from the operating hours of the equipment, with maintenance intervals arranged in miles/kilometers obtainable. The preventive maintenance inspection is vital to the life of industries, airline industries, and the communities for many reasons.

It assures that drivers and pilots will be driving safe vehicles, though it is against the law and regulations to allow unsafe vehicles or planes out on the road. As such, STEMS will enable industries and corporations to DOT required preventive maintenance inspection programs, standard lubrication procedures and PMI scheduling, to enhance environmental safety standards on the supper highways and commercial environment of airways. With its services, vehicles will be assured that the designed life expectancies of their components are achieved. STEMS services ensure industrial safety by the distribution of transportation solutions to mechanical and electromechanical component failure analysis and solutions, preventive maintenance inspection procedures, through the transformation of transportation required maintenance inspection procedures into e-commerce transportation technology and solutions. Some companies have failed to follow the guideline setup to protecting everyone, including the carriers, the public, the clients and the drivers. This is because these companies lack the clear understanding that preventive maintenance inspection is the key to safety and assures that every component of the vehicle or plane must be in good running order.

Also, the vehicle must be in safe operating condition before it could be classified in service. Finding small problems during the preventive maintenance inspection and correcting them before they become big and expensive is vital to company's operation and public safety. Accordingly, servicing the vehicle as scheduled will eliminate future repairs and safe money for the company. STEMS will supply online preventive maintenance inspection forms for A, B, C, D type preventive maintenance inspection programs. The forms will address all items that are relevant to the vehicle's safety and which require periodic inspections to further ensure safe, efficient, reliable and trouble free operations of industrial equipment. The forms will include a step-by-step directory to finding defective components and how to identify said defective components through a rundown inspection.

Drivers and technicians will be re-educated on how to conduct and coordinate preventive maintenance inspection on vehicles and airplanes efficiently before the vehicles are put to service. That is, STEMS will provide pre-trip and post-trip inspection forms for the drivers to perform daily inspections before taking the vehicle to the road. Any discrepancy that will arise about the vehicle during the inspection will be reported to the fleet technicians or managers. Technicians will also follow a scheduled preventive maintenance inspection in addition to the drivers pre-trip and post-trip, from the reported mileage and hours of operation of the vehicles to eliminate any excuses that may arise from defective vehicles being put on the road. STEMS will also bring to the industrial environment, the same preventive maintenance programming required of DOT by law, that unfortunately, aren't in place in about 85% of transportation and trucking industries. However, the law requires that drivers perform a pre-trip and post-trip inspection to assure that on service vehicles are safe before said vehicles are actually put to service. STEMS transformation of transportation industries safety programming and preventive maintenance inspection, with absolute solutions to transportation component failure analysis, and or vehicular failure, into e-commerce applied transportation solution technology is revolutionary. It enables signing-in companies hoping to avoid problems with the DOT safety and preventive maintenance regulations, keeping them updated through its services, with all the standard and up to date changes within the transportation industries preventive maintenance programs. In addition, it will help drivers and technicians know how to execute details of each inspection through a step-by-step rundown of the components and the keys to detecting signs of failures. The pre-trip and post-trip inspections will entitle safety and also enforce the driver's awareness to the safety prescribed routine prevention. It will also assure the said drivers that only save vehicles are to be put on the road. The preventive maintenance inspection entitles scheduling the vehicles in a timely fashion, offering a systematical cook book rundown of the inspection procedures, including how to also detect defects and Correcting them before they become hazardous to the environment.

The preventive maintenance inspection enables a perfect assurance that all the fleets of in service vehicles are safe for the environment. STEMS will bring company personnel and maintenance managers to the awareness of its services and how the services are lined with the DOT regulations and the law required safeties. Preventive maintenance inspection "PMI" forms will orderly and systematically be provided to the technicians or corporate maintenance offices, outlining the components and parts that are to be checked and inspected during routine inspection. It is necessary, for records, that all PMI forms should be kept in order at all times because the records are required by DOT. The many useful need of the record is that: The record will provide vehicle history, which represent a study of the vehicle's performance and failures. The record will provide the cost analysis of the vehicles. The record will help in planning PMI scheduling. The record will also help to provide maintenance history. Clients will log on to STEMS to gain access to its resources on the server database from anywhere. Industries will have to provide a password and username at logon in other to be allowed these services. The server will then authenticate the users and then allows access or total permission. The server naming convention will identify industries logon names and will replicate letterheads for any industry-requesting information. STEMS will keep a database of all fleet required maintenance records, which could be requested at any time by the company.

Motor carriers are required to maintain some of the records and information for every vehicle the industry's control for thirty days or more. These records are:

(a) Vehicle identification numbers, which includes serial number year, tires size and company number.
(b) Schedule inspections to be performed, including the various types of inspection and due dates.
(c) Inspection, repair and maintenance records.
(d) Records of tests conducted on buses with push-out windows, emergency doors, and marking lights.

STEMS software will allow transportation industries to license its services online, and will also customize and integrate into the industries web sites. With the software, each registered mileage for any equipment in the industry's fleet will be stored while counting the required mileage to enable generating a preventive maintenance program forms for that equipment. STEMS technology, which will sell to transportation industries and commercial companies, is a web-base warehouse of solutions to mechanical failure and subsequent transportation and trucking component failure analysis and solutions. Its software allows page-by-page pre-designed letterheads of signed-in companies. The software will permit its clients to sign-in, search for solutions, schedule preventive maintenance inspections, request preventive maintenance forms, request repair order forms, keep monthly records of maintenance activities, and also allow companies names be printed on each form. That is, when companies access solutions or preventive maintenance forms from STEMS, the print out forms on the company's plain printing paper will print the company's letterhead on each page. Thereby saving the company money for printing or ordering of preventive maintenance and repair order forms. The warehouse will serve as the integral part of data extraction of solutions, were all the compiled solutions and the designed preventive maintenance forms are stored. STEMS is a Web-based central transportation technology, offering solutions that give transportation industries access to improved maintenance, with extensive solutions to failure analysis. Information to STEMS will quickly and efficiently be accessed for the problem quo researched on, making said solutions a computational transportation e-business. Companies or subscribers will be able to access STEMS services from their desktop computers to STEMS Internet servers through the network or Internet, enabling a network of transportation telecommunication and system analysis technology for industrial and commercialized corporations.

The technology diagnoses mechanical, electromechanical, and hydro-mechanical problems by a typed in research mode from personal and networks computers that are linked to Tajintech Corporation's servers or STEMS servers.

SUMMARY OF THE INVENTION

The present invention provides on-line services to its transportation clients, capturing the business of eliminating safety preliminaries in the industrial and commercial environment. Its services will grow to providing similar services in other parts of the world. Detailed analysis of any transportation equipment failure will enable transportation technicians and scientist to better their understanding of component failure and their electromechanical behaviors. This will accelerate the advancement of technologies in the transportation industries. The transformation of transportation industry to e-commerce technology will bring out good industrial management, which are very rare to find with hands on experiences. The applied technology of STEMS is made accessible anywhere in the country and around the world. Users or companies will need to sign in, and a programmed code will be assigned to the users while releasing a password that will enable the customer's identity and allow users to utilize STEMS services. Companies will have to pay a monthly transaction or utility fee for the services of STEMS. Its software, which is designed for the very best services of STEMS, will manage other business processes to integrate the transportation industries routine demand for safety programs into e-commerce application to standard industrial solutions. By implementing STEMS system, there will be increased awareness and focus on transportation safety standards, with a cookbook directory to mechanical failure analysis and solutions, electromechanical failure analysis and solutions, electrical failure analysis and solutions, hydro-mechanical failure analysis and solutions. Also, technicians will gain experience applying their expertise in problem solving from the e-commerce cookbook application worldwide. These are enabled from the database warehouse by the software when a command is received.

Said command is indicative of the problem quo, integrating with the solutions to make output results seamlessly in accordance with the said problem quo.

The demand for safer highway is increasingly reducing industrial safety standards and occupational health injuries are increasing as a result. Still, correctly performed preventive maintenance procedures are critical to the operator's safety, technician safety, and very reliable to the proper operation of the equipment. In accordance, the software for STEMS will manage industrial information, storing accessing data for the transportation e-commerce, and also transforming said data into a vast knowledge for industrial solutions. Accordingly, STEMS will implement safer industrial practices not only to advancing industrial standards, but also to reducing accidental injuries, deaths, and also reducing workers injuries and compensation cost. Industrial standards will also be improved and the risk factor will be reduced dramatically with STEMS application. The many pros with STEMS are; less break downs on the supper highway, less accidents on the highway, lower workers compensation cost, lower medical cost, less insurance fees, reduced industrial downtime, lower maintenance cost, expanded life of equipment, and increased profitability.

BRIEF DESCRIPTION OF THE DRAWINGS

FIG. 1 is seen to represent a description of the network station (35), the industry (100), and the corporate building (200).

DETAILED DESCRIPTION OF THE INVENTION

Figure 2:
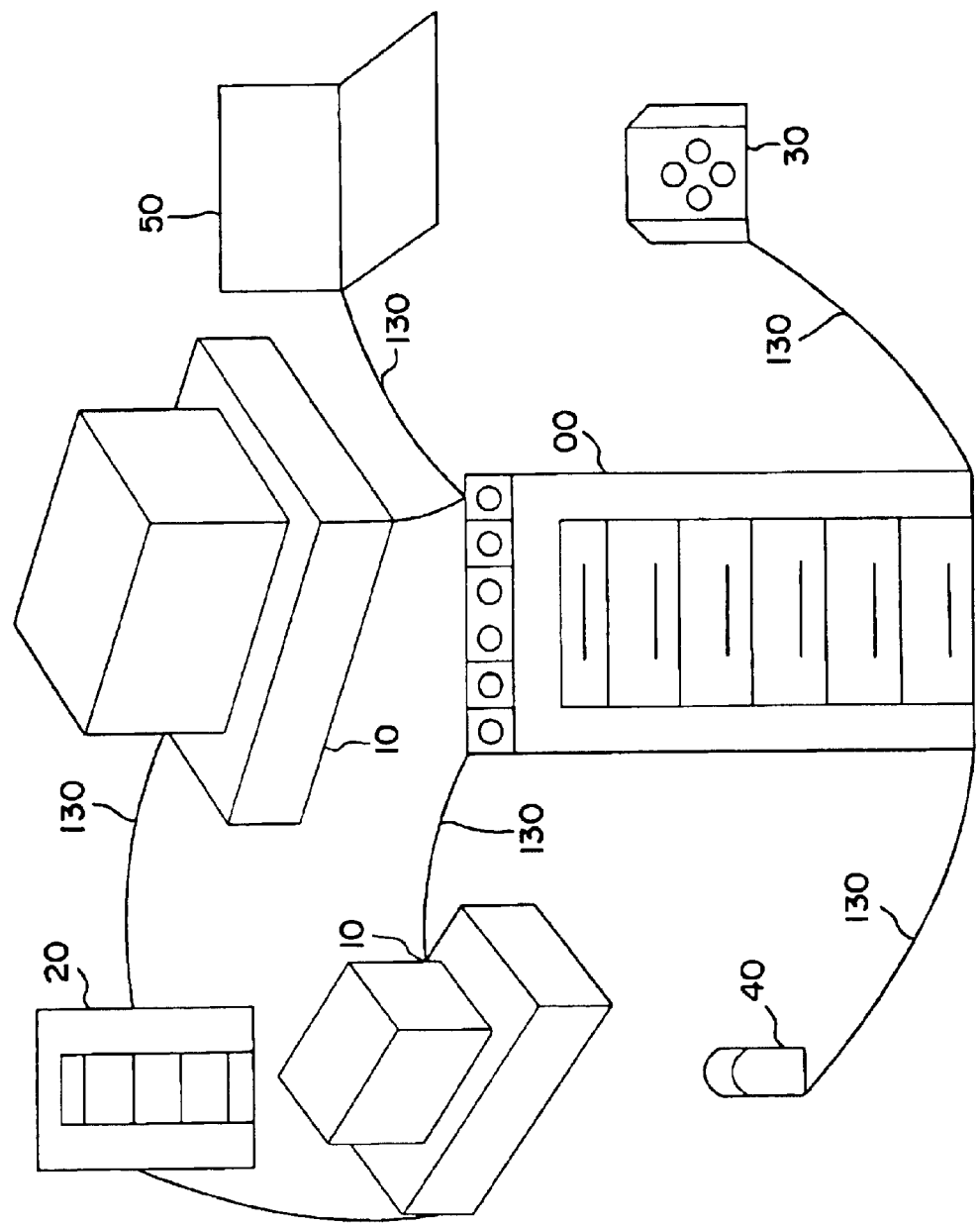
FIG. 2 is seen to represent the desktop computers (10), the network computer (20), the handheld computer (30), the wireless device (40), the laptop computer (50), and the server (00).
Figure 3:
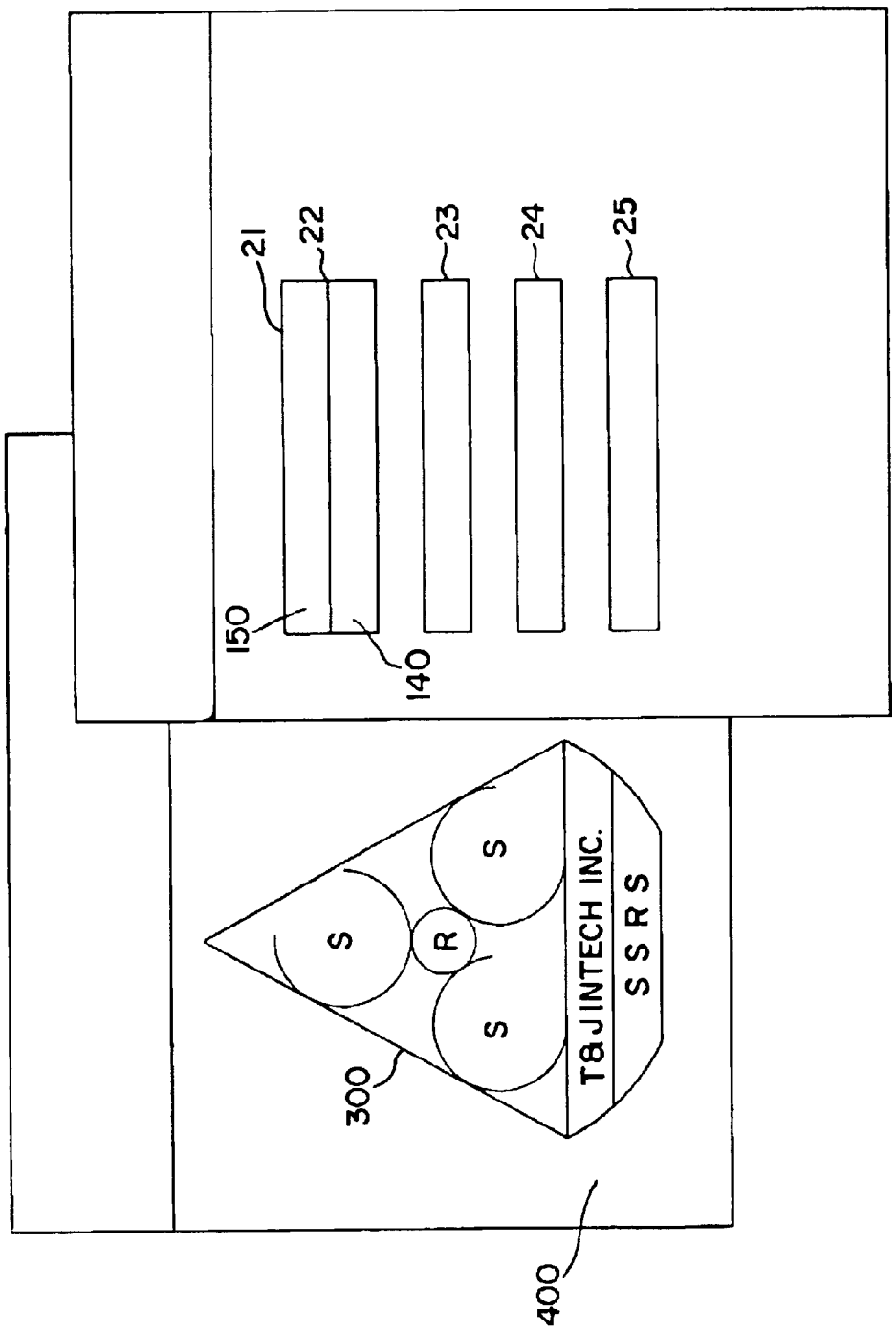
FIG. 3 is seen to represent the logon screen (400), the STEMS icon (000), the company names column (150), the password column (140), the search columns (21), the first column (22), column1 (23), column2 (24), and the connectivity column (25).
Figure 4:
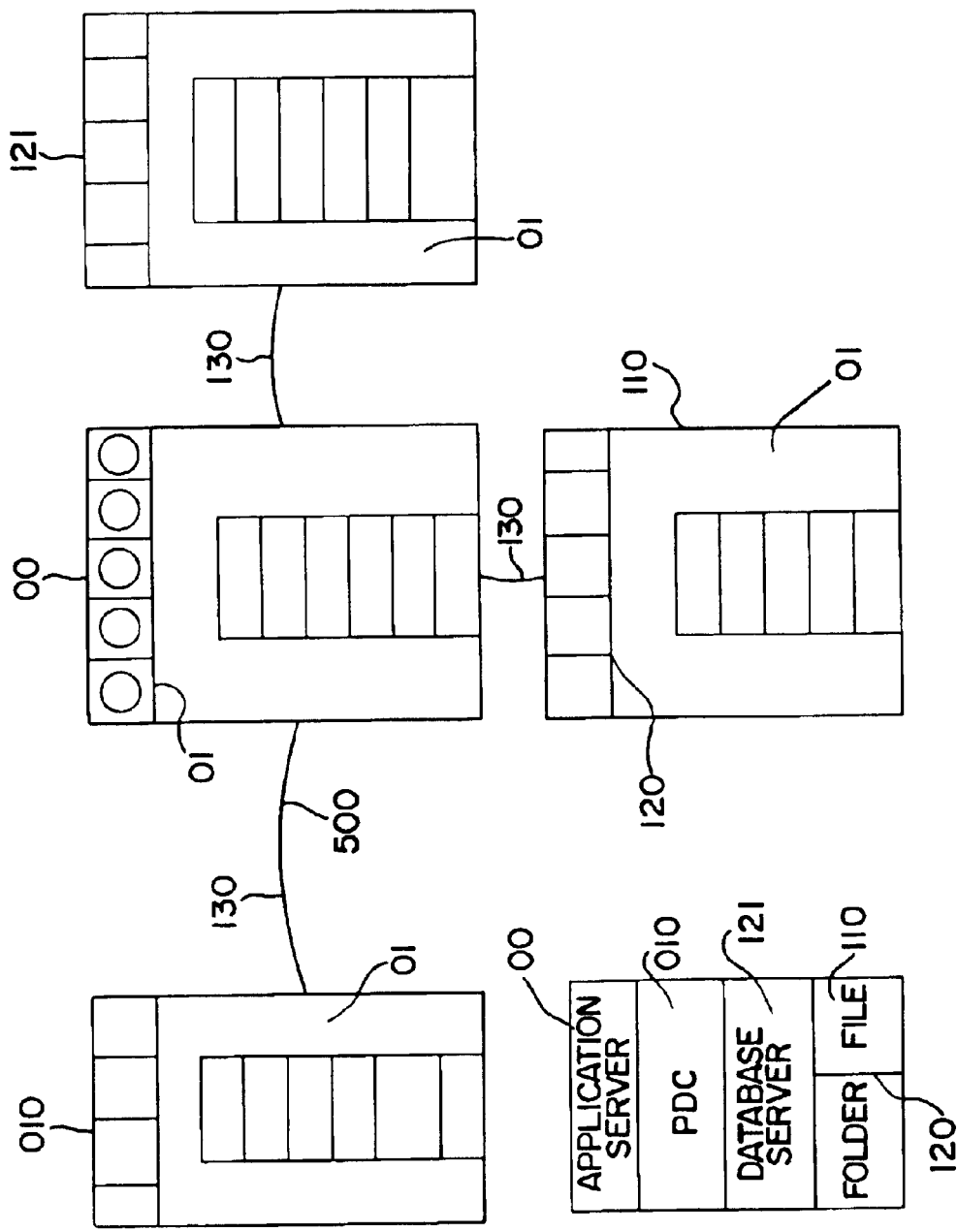
FIG. 4 is seen in a network with the application server (00) communicating with the PDC (010), the database warehouse server (121), and the file (110) and folder server (120). The block diagram further explained the communication sequences.
Figure 5:
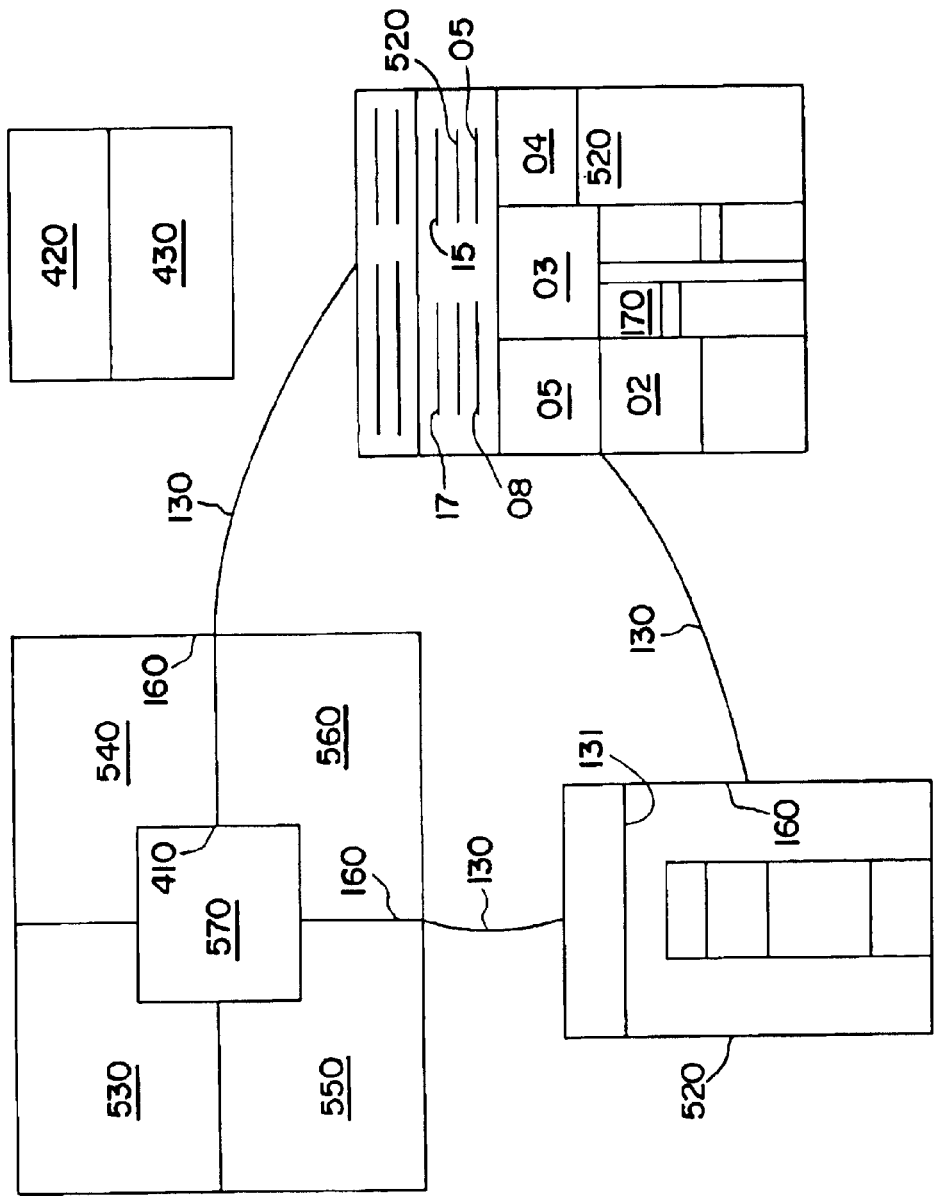
FIG. 5 is seen to represent the tools (01), the router (520), the transport protocol, the default protocol, and the model layers for communication.
Figure 6:
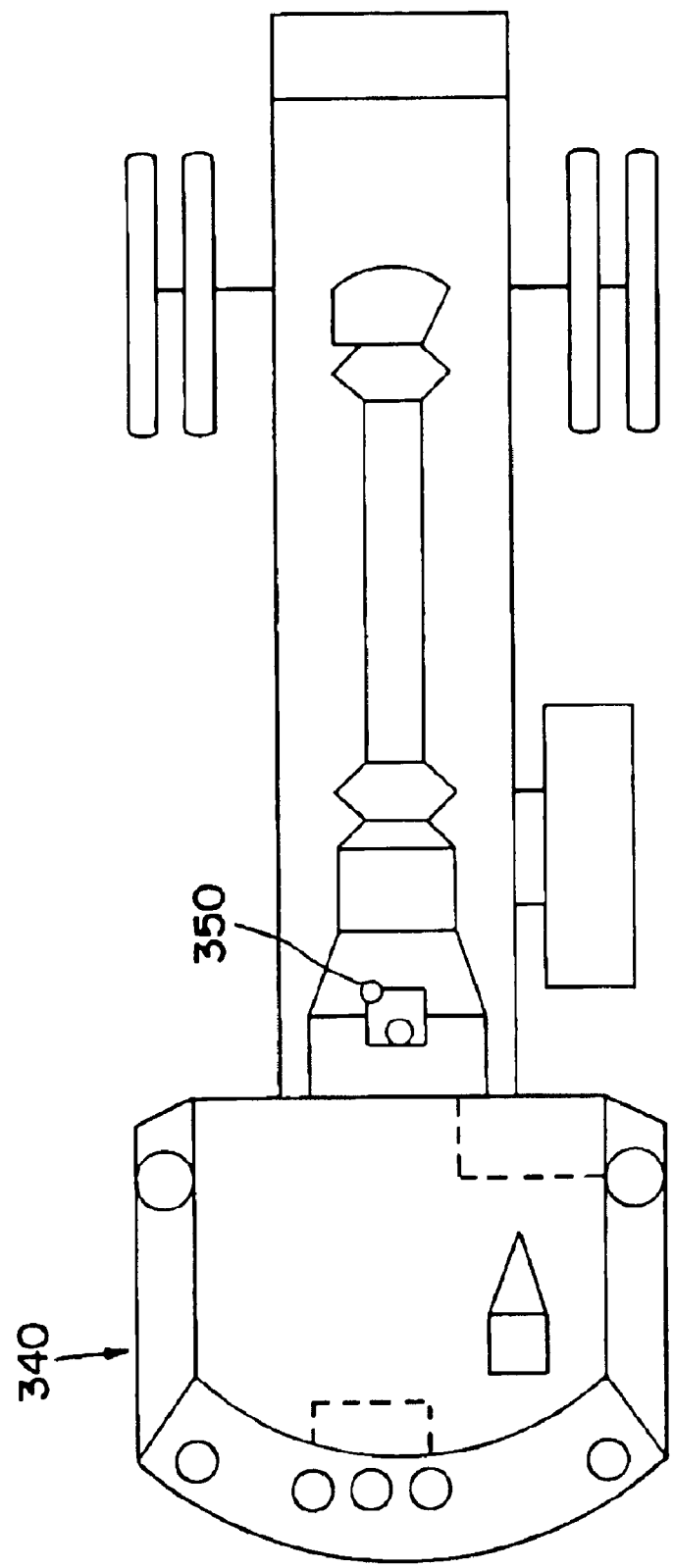
FIG. 6 is a representation of a transportation equipment (340) showing a component (350).

STEMS e-commerce technology provides comprehensive analytical application solutions for transportation technical support. Its services allows industries and corporations to research on solutions on transportation vehicle's failures from a desktop computer (10), a network computer (20), a hand held computer (30), wireless devices (40), and a laptop computer (50), through its server (00). Its software (300), is the operating system for the server (00), and the applications that enable communication with other devices and computers, for enabling response to transportation industries research request. The software (300), will allow the server tools (01), to communicate with each other while the application permits users to perform their search task. When the tools (01) communicate, the ROM (02), will allow the software (300) to also communicate with the hardware (04) of the server computer (00), enabling security and reliability on the industries files (110) and folders (120). The file (110) or folders (120) are created in another database (130) through a primary domain controller "PDC" (010), or another set of file/folder server for keeping industrial or corporations records. The PDC (010) will centralize all the industry's computers from a cable (130) through network adapters (160) or wireless communication device (40). The network adapters will then provide the physical connection to the network, locating the physical addresses of industrial computers or other devices. The PDC (010) will receive the industry's name (150), and password (140), at the initial logon screen (400), and create security identification that will then set permissions and rights for the industries services. Connectivity is then allowed through protocol communication, permitting data to be sent through network adapters (160), into cables (130) or other wireless means. The network interface (170), will then pull out or put in network adapters (160), the data through the cables (130) with no internal protocol. The communication process from one computer to a network, to retrieving data, will pass through model layers that will assign specific task to the layers. The application layer (530), will support files, application services, print services, message services, and database services before they are sent to the presentation layer (540), that will convert and code the data.

After the data are coded, they are then sent to the session layer (550) that will then manage all the communication process to the transport layer (560). The transport layer (560) will then deliver the data to the end user. The network layer (570) will also enable data to be moved over the Internet through routers. The Internet protocol layers (410) will then encapsulate the search packages into data-gram that will run through its algorithms into the database problem and solution addresses (131). The problem and solution addresses (131) is enabled by the transport protocol (420), which provides communication between computers, or the default gateway (430), which allows computers in a network to communicate with computers outside of the network. Its digital information to e-commerce transportation solutions enables imperative mainframe for absolute maintenance, sharing dominance to improving standards and competitive safety over transportation industries (100) and corporations (200) maintenance programs. When any transportation equipment (340) experiences any type of a failure, industries (100) and corporations (200) will enable STEMS services by clicking onto STEMS icon (000). When the icon (000) is clicked, a screen (400) will be enabled and search columns (21) will pop-up on the screen (400). The first column (22), will identify the type of equipment, while enabling the failed component to then be entered on the search column1 (23), to identify the restricted area of the search. A detailed description of the behavior of the failed component is next entered in column2. After column1 and column2 are entered, another key, the connection key (25), is clicked to allow communication between STEMS server (00) and the desktop computer (10), the network computer (20), the hand held computer (30), wireless devices (40), and the laptop computer (50). The server (00) is another set of computer at a network station (35) that handles and processes all the requested information and controls all communications at the said station. The server (00) will receive the information from column1 (23) and column2 (24) and matches the columns with the components at its data warehouse (121). The data warehouse (121), which is a memory where all the transportation data are kept for searches and retrieval, will then read the information, code it, and match each coded problem with its coded solution.

The components (350) have all the possible failed problems at the warehouse (121), so that when the information on column2 (24) is received at the network station (35), the server central processing unit "CPU" (03) will then enable the ROM (02). The ROM (02) will logically read the information on column2 (24), assigns a matching code to column2 (24), and match the solution code to the problem code. Industries (100), corporations (200), fleet facilities will then receive the solution code in text format and enjoy the global trading of DOT standard requirements and run-down solutions to correcting the failed components (350). The distribution of the solution code of failed components (350) will enable participation in the open data sharing activities for all types of transportation equipment (340), and also improves maintenance applications to the said equipment (340). The shared information about the solution code is the excellent solution that is read to the end user as the possible solution. Necessitating the openness to real solutions is inescapable to safety and maintenance standard. Therefore, the coded solution is digitized and the digital transformation to e-commerce transportation technology for solutions will enable absolute maintenance for its market share, advancing safety and maintenance standards to the industrial environment. This invention will allow maintenance to be the key factor to the transportation breakthrough into e-commerce. The invention's cutting edge in electronic business to transportation services enables participation in the open trading of its activities with industrial partners, generating PMI programs (15), and forms (16), from the compiled mileage (17) of the individual equipment (340). The software (300), upon receiving the compiled mileage (17) information, will then assign the RAM (05), to locate the industries complete address, and a letterhead is generated. If the mileage is in addition of the preset number set alternate, the software (300) will enable a readout tool (08), that will then initiate a PMI printout form (16), for the particular equipment. The ultimate destination of the printout forms (16) depend entirely on the state of the openness between existing transportation industries and the digital marketplace, which will allow printout through the industry's printers by the recognition of protocol addresses and password.

STEMS digital industrial marketplace will do businesses with transportation industries, sharing and exchanging its services, such as inventory of PMI, production scheduling of repairs, ordering of information from the files (110), information on cost per maintenance of industrial equipment (340), to advancing the way transportation industries conduct businesses. STEMS digital mainframe solution will thrive industries to top off safeties by building a thorough preventive maintenance programs from its software (340), to its client information center or PDC (010). The proliferation of the digital market places will lead to the creation of advance maintenance that will develop new services based on the existing digital market functionality of STEMS. The invention's open digital mainframe solution will also fulfill the advancement of Net Communication in the transportation e-commerce by implementing a step-by-step rundown of a preventive maintenance inspection program "PMI" (15) that will enhance safety and eliminate cost and downtime. STEMS provides the vehicle of choice for solving transportation problems over the web, advancing online destination services where businesses will take advantage of the growing variety of its services, which are important to industrial efficiency, profitability, and success. The invention also enables process integration with Internet Technologies that will make problem solving easier, by providing a digital workplace that offers the next level in fulfilling industrial promises of safety through the Net economy. That is, it provides online location center through which a company can offer and access all its e-commerce services and contents, finding and solving transportation problems through the use of its software (340) and the new Internet-based business services. The services will improve safety and productivity through the digital transportation market supplement. The invention's activities are carried through the applicable modeling of tools (01), mediating between subjects and objects by defined routes, enabling transportation solutions to defined problems. The tools (01), will enable individual and functional creative ability of computers to interact with the server (00), routing problems and extraction solutions for the routed problems. When the individual accessories are processed through tools (01), objectification is enabled, allowing the columns (21), to be accessible to other tools like the data warehouse (121).

Results are then produced through the social interaction between plurality tools (01). The invention is also design to exemplify build-in system research tools (01). These tools (01) are augmented reality to systems tools of ordinary systems developed to enhance transportation solutions with its graspable hardware (04) and software (340), which supports industries (100) and corporations (200) industrial planning and decision making of their maintenance fleets. STEMS Maintenance is a comprehensive technical support and product upgrade program that is designed to enhance industries and corporations with DOT standard e-commerce application. Its solutions are focused on offering and providing technical support staff with a high level of support expertise on STEMS products and services. The present invention encompasses, but not limited to the following claims:

What is claimed is:

1. An industrial standard transportation maintenance solution for supplying information and enabling telecommunication means through at least a web-based facility, wherein said web-based facility enables on-line services to handle transportation maintenance programs and enable prescribed solutions to failed equipment components in accordance with DOT and equipment manufacturer's format, and wherein said communication system for said web-based facility contains software for generating transportation preventive maintenance inspection programs and forms and for enabling solutions to transportation component failure without a physical connection means to at least a transportation vehicle, comprising:

a computing database warehouse for compiling and storing information and solutions in connection with at least one transportation equipment;

a network computing means for record keeping of files and for the centralization of a plurality of computing means from other connecting and communication environments;

a plurality computing means for inputting and outputting characters and symbols indicative of queried information from at least one database warehouse, and for communicating with other computing means;

a screen monitoring means for optically sensing and displaying images and said information and characters extracted from a database warehouse;

interface switching means connected to said database warehouse for designating a range of assigned characters in a text and binary comparison with coded characters in the said database warehouse in response to queried input for enabling network and online communication and solutions to said queried input;

a web-based computing means coupled to said interface switching means for connecting an input signal from a user to said network computing terminal based on at least one condition, wherein said condition is in accordance with a user security number, said security number being stored such that said network terminal in accordance with said selected condition enables entry capable of accessing said database warehouse on at least one selected user security number corresponding to said condition;

a control means for relocating a range of assignment while maintaining a defined task of characters or symbols in exchange for a solution, wherein said solution is viewed on said monitoring means when the said characters are within a defined range of assignment;

means for updating connectivity to said database warehouse, and for updating the range of assignment when a connection is disabled or enabled;

signal processing means, connected to said updating means for executing a prescribed function corresponding to the said updated function in response to the operational set mode signal, for generating a matching solution to a defined failed equipment components; and image output means, connected to a signal processing means, for generating an image in response to a matching solution.

2. A transportation system as claimed in claim 1, wherein said system comprises means for enabling a web-based standard transportation excellent maintenance solution for supplying online preventive maintenance inspection programs and solutions to failed components, and for enabling technical support to transportation providers.

3. A transportation system as claimed in claim 1, wherein said system comprises means for providing a step-by-step directory to finding defective components and for providing solutions to said defective components through a web-based online analytical rundown of transportation failures and industrial problems and solutions for enabling vehicular preventive maintenance.

4. A transportation system as claimed in claim 1, wherein said system comprises means for transforming transportation required maintenance inspection procedures into an electronic commerce transportation technology for enabling web-based transportation vehicle maintenance solutions.

5. A transportation system as claimed in claim 1, wherein said system comprises means for ensuring industrial transportation safety by means of an online distribution of transportation solutions to mechanical and electro-mechanical component failures and analysis through a system of network distribution to transportation providers.

6. A transportation system as claimed in claim 5, wherein said system comprises means for transporting at least a routine transportation safety procedure online, said transportation safety procedure includes equipment such as transport planes, transport vehicles, and marine equipment, and for executing standard preventive maintenance inspection and enabling at least one solution to said component failures.

7. A transportation system as claimed in claim 6, wherein said system comprises means for enabling preventive maintenance programs online and for providing means for scheduling at least one transportation equipment for preventive maintenance inspection in response to the operating hours and fuel consumption of said one transportation equipment.

8. A system and apparatus for assembling solutions and preventive maintenance programs to transportation equipment component failure without a physical connection to said transportation equipment, for executing defined tasks through a controlling electronic procedure, enabling data and solutions when queried for transportation preventive maintenance and repair activities, wherein said procedure includes a controller responsive for inputting commands and outputting solutions for said activities to at least one monitor screen, comprising:

means for generating a master database warehouse describing a plurality of language files containing compiled component failures and solutions to fixed transportation maintenance programs;

means for generating a variable PDL file containing database information descriptions of variable transportation component failures with variable information regarding solutions for said failed components;

means for invoking said master database warehouse and variable PDL file descriptions in conjunction with queried text for online procedures, wherein said online procedures imposes activation of the said master database warehouse and variable PDL file context for enabling online transportation solutions to at least one local output device;

means for transmitting the imposed master database warehouse and variable PDL file into a display and output device readable on a screen or printout means;

first means for developing a template file defining said readable language with fixed information common to said variable PDL file, wherein said template file and said variable PDL file information are unique to at least one language in the database for enabling readable screen display of at least one solution to said queried text;

second means responsive to the first means for developing a master data file unique to generating transportation solutions to failed components and for generating a preventive maintenance program from said template file, wherein said master data file defines transportation information generally common to at least one make and model vehicle;

database means having entries therein representing at least one queried text for enabling variable information relating to transportation safety, wherein said variable information is readable by other of said at least one electronic devices; and means wherein said means responsive to said database means and said first and second developing means for converting the said template file and the database context into responses unique to at least a typed queried command for specifying the sequence and the content of the failed component and for enabling solutions to said failed component.

9. A system and apparatus of claim 8, comprising software for enabling responses to requested information and for solving at least one transportation problem by allowing server tools to communicate with other electronic devices such as at least one computer from a remote user terminal.

10. A system and apparatus of claim 8, comprising at least one application tool for permitting at least one user to input and perform a defined task.

11. A system and apparatus of claim 8, comprising a ROM for allowing at least one software to communicate with at least one hardware, for enabling security and reliability on industrial files and folders.

12. A system and apparatus of claim 8, comprising at least one server for keeping all records and for centralizing at least one computer through at least a cable wireless connection, for creating security identification and setting permissions and rights for end users.

13. A system and apparatus of claim 8, comprising a network adaptor for providing a physical connection to at least one network, and for locating physical addresses of at least one communicating device of at least one end user.

14. A transportation information and communication system that requires no physical connection to transportation equipment, for enabling an electronic means of generating a standard transportation excellent preventive maintenance program online, wherein said maintenance program includes solutions to failed transportation components that have been encoded for correcting a plurality of mechanical and/or electro-mechanical component failures by at least one processing means, and wherein said processing means enables online communication programmed to respond to at least one queried text for initiating a sequence of failure analysis from the make and model of at least one transportation equipment, and for enabling solutions contained in at least one database context for enabling responses to a plurality of sequences of at least one transportation equipment component, at least one sequence includes at least one error correcting means responsive for describing at least one failed component when said description of the said failed component is typed therein, for generating at least one unique transportation system solution which is respective information for correcting said sequences of error prior to screen display solutions thereto, which are integral multiples of standard preventive maintenance solutions enabling safe operation of said transportation equipment and at least one predetermined transportation solution for failed components for correcting at least one failed component of the sequence thereof, comprising:

an operator terminal for computing at least one query by a person to enable communication through web-base transmission and for enabling at least one receiving and monitoring means;

a transmitting, a receiving, and a monitoring means including memories for storing text and images, and for editing functions and selected parameters from at least one operator specified text request responsive to designating data functions in response to said request;

an analyzing means for analyzing said data received by at least one processing means, for establishing parameters of user requested information responsive for each of the plurality of selected inputted request elements being monitored, and for determining potentially favorable solutions to said request;

editing means, connected to said monitoring means and a processing means, for adding, deleting, and correcting selected search characters for processing by at least said processing means;

means for recording edited digital information on a medium, wherein said means includes at least an initial and final process of editing the digital information at predetermined points of selected inputs and/or outputs so that multiple solutions to failed components are enabled;

means for signaling from at least one computing device to beyond selected environmental terminals when said at least one computing device deviates from normal use parameters being monitored; and a transmitting means and a receiving means for monitoring at least one database content, wherein said transmitting and receiving means include time and duration of a plurality of selected inputs and outputs of transportation information, for reporting transmitting data and for monitoring receiving data from and through each of the processing means.

15. A transportation information and communication system with at least one electronic means as claimed in 14, comprising a model layer for communicating through at least one computing means to at least a network receiving data source for enabling online information and communication thereon.

16. A transportation information and communication system with at least one electronic means as claimed in 14, comprising an application layer for supporting files and application services, print services, message services, and database services, and for enabling first identities of equipment make and model per typed query, and second identities of entries of detailed descriptions of search problems to enable at least one solution.

17. A transportation information and communication system with at least one electronic means as claimed in 16, comprising a presentation layer for coding data from said application layer.

18. A transportation information and communication system with at least one electronic means as claimed in 14, comprising a session layer for managing all communication processes to at least one transport layer for delivering data to at least one end user.

19. A transportation information and communication system with at least an electronic means as claimed in 14, comprising a network layer for enabling data to be moved online/wirelessly over the internet through routers, and for communicating with internet protocol to enable encapsulating search data into at least one readable data gram for transmission to at least one end user.

20. A transportation information and communication system with at least an electronic means as claimed in 14, comprising a transport protocol for enabling problem and solution addresses, and for enabling communication between at least one computing means and a default gateway.

* * * * *